Dec. 10, 1940. T. C. DELAVAL-CROW 2,224,255
LUBRICATING DEVICE
Filed Jan. 26, 1938
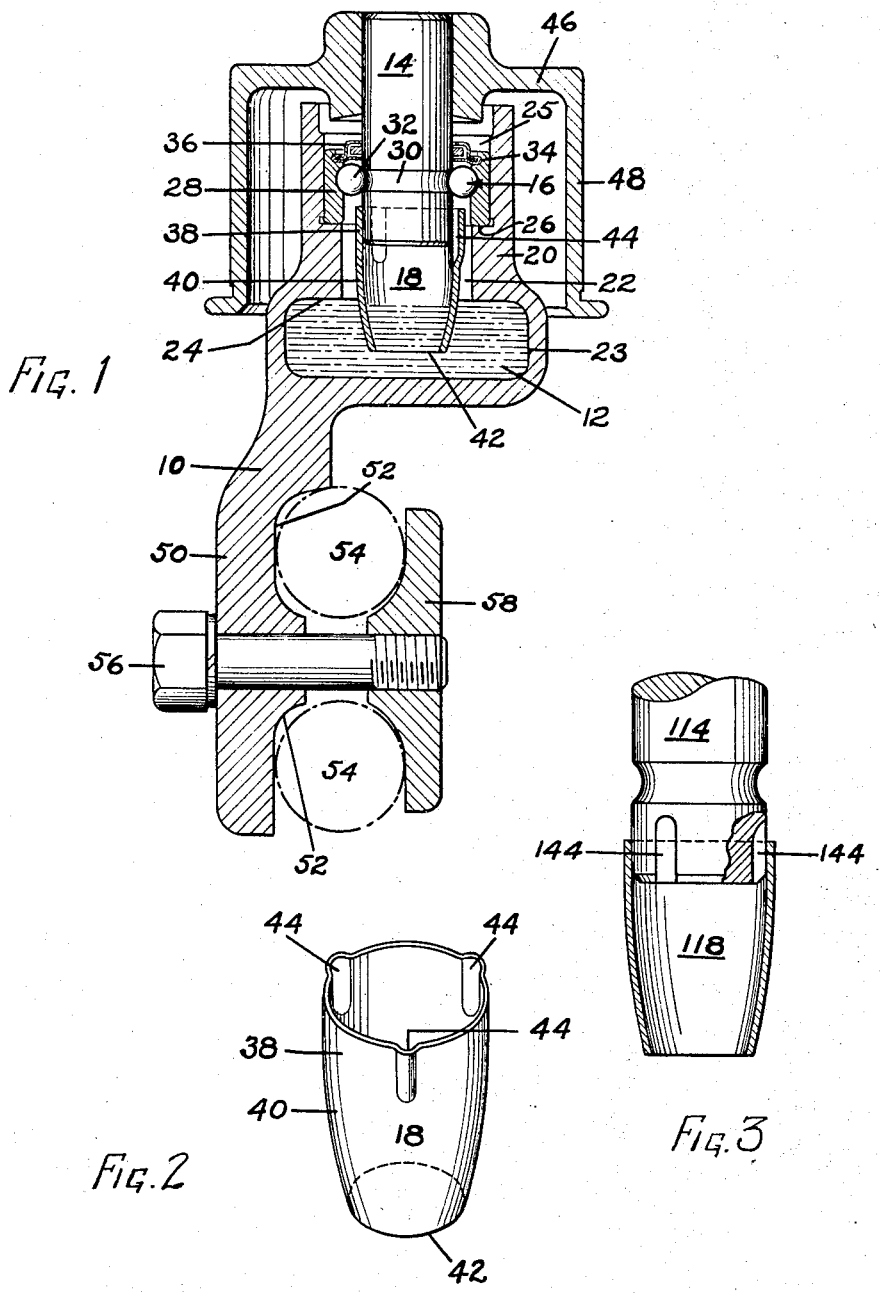
Inventor:
Thomas C. Delaval-Crow
By ………………
His Attorney.

Patented Dec. 10, 1940

2,224,255

UNITED STATES PATENT OFFICE 2,224,255

LUBRICATING DEVICE

Thomas C. Delaval-Crow, Bristol, Conn., assignor to General Motors Corporation, Detroit, Mich., a corporation of Delaware Application January 26, 1938, Serial No. 186,948

7 Claims. (Cl. 308—134.1)

This invention relates to lubricating devices for bearings and more particularly to lubricant feeding devices for bearings rotatably supporting high speed shafts.

Heretofore, it has been difficult to correctly and efficiently lubricate vertically disposed bearings having parts rotating at a high speed, since the centrifugal forces set up throw the lubricant away from the fast rotating parts of the bearing. High speed bearings tend to overheat if either under-lubricated or if over-lubricated, and it is desirous to not only supply lubricant in sufficient quantity for lubricating purposes, but also to provide a controlled volume of fluid lubricant feed to prevent heat generated from fluid friction. Rotating splash systems have proved unsatisfactory for delivering a required amount of oil to a bearing from a reservoir, and have also usually involved complicated and expensive mechanisms.

One object of the present invention is to provide a lubricating device which is not only highly efficient for feeding the lubricant from a reservoir to a bearing, and more particularly to an antifriction bearing supporting a shaft for high speed rotation, but is also of simple and inexpensive construction.

Another object is to provide an oil feeding device which may be quickly and easily applied to a standard type of a non-horizontally disposed rotatable shaft for automatically feeding a fluid lubricant from a source of supply to a shaft bearing at a rate commensurate with the speed of shaft rotation.

A further object is to provide an improved oil slinger which may be cheaply and easily formed by a pressing operation and which may be mounted on the end of a non-horizontally disposed shaft to propel fluid lubricant by centrifugal force to a shaft bearing and against the action of gravity.

To these ends and also to improve generally upon devices of the character indicated, this invention consists in the various matters hereinafter described and claimed.

In the drawing:

Fig. 1 is a vertical section through a textile machine pulley and its mounting embodying the invention;

Fig. 2 is a perspective view showing the lubricant feeding device; and

Fig. 3 shows a modification.

In the illustrated embodiment, a housing 10 provided with an oil reservoir 12 at its upper end rotatably supports a substantially vertical shaft 14 through an anti-friction bearing 16 for high speed rotation, and a lubricant slinger 18, in the general form of a sleeve fitted over the lower end of the shaft and extending into the reservoir, produces a continuous controlled circulation of a fluid lubricant, such as oil, from the reservoir to the bearing and back to the reservoir whenever the shaft is rotated.

In accordance with the drawing, the housing 10 has a head 20 at its upper end provided with a downwardly extending bore 22. The head 20 is enlarged at its lower end and internally chambered at 23 providing the oil reservoir 12 at the lower end of the bore 22. This chamber preferably has a much larger cross sectional area than that of the bore 22 so that the upper chamber wall 24 surrounds the bore and prevents excessive splash feed of the oil to the bearing 16. This construction also provides for an initial oil supply of ample volume to last throughout the life of the bearing and to always provide the required cooling capacity for the bearing. The upper end of the bore 22 has a counter bore 25 terminating at its lower end in a shoulder 26, and the bearing 16 has an outer race ring 28 pressed into this counterbore and seated against the shoulder. The inner race in the present showing is constituted by a peripheral groove 30 in the shaft 14, and the balls 32 are located in rolling engagement with the inner and outer races in the usual manner to provide an efficient antifriction bearing adapted for high speed rotation of the shaft 14. The upper end of the outer race ring 28 is preferably internally and peripherally grooved at 34 to support an annular lubricant retainer 36, such as that shown in my prior United States Patent No. 2,054,580, issued September 15, 1936.

The lubricant slinger 18 is shown as an open-ended, longitudinally-tapering sheet metal sleeve which may be easily and inexpensively shaped as by a simple machine pressing operation. This sleeve is somewhat cup-shaped and has an upper cylindrical end 38 adapted to be forced tightly over the lower end of the shaft 14 beneath the bearing balls. Merging with the cylindrical portion 38 is a downwardly and inwardly tapering wall portion 40 terminating in the lower open sleeve end 42 of reduced diameter which extends into the lubricant reservoir 12. The wall portion 40 is preferably longitudinally curved to provide a smooth flow of the lubricant as it rises in a manner to be described. A plurality of peripherally spaced oil conduit grooves 44, disposed generally longitudinally of the slinger

18, are formed by struck-up portions in the upper end of the sleeve and provide lubricant passages between the shaft and the sleeve. These passages extend beyond the end of the shaft, and preferably from the top of the sleeve to the tapering wall portion 40, to facilitate delivery of the lubricant to the bearing 16 in a manner to be described.

Fig. 3 shows a modification wherein the shaft 114, similar to shaft 14, is provided with oil conduit grooves 144 in its lower end which serve in the same capacity as the oil grooves 44. In this construction the sleeve member 118 need not be provided with oil grooves.

During rotation of the shaft and the bearing balls, a portion of the fluid lubricant within the reservoir and engaged by the lower end of the slinger 18 or 118 will flow up the inclined wall portion 40 of increasing diameter since the centrifugal force set up by the shaft rotation will overcome the force of gravity. The fluid lubricant will thereafter flow through the oil grooves 44 or 144 and be forcibly slung upwardly between the bearing balls and the raceways, its upward escape from the bearing being prevented by the retainer 36, and then the action of gravity will return the lubricant to the reservoir 12. The amount of oil required to lubricate the bearing is relatively small as compared to the volume of oil in the reservoir. Hence, a small amount of oil will be continuously drawn from the initially cool reservoir, delivered through the bearing, and then fed back into the reservoir, thus providing an automatically controlled lubrication and cooling of the bearing 16, throughout its entire life. The volume of lubricant delivered to the bearing 16 will be commensurate with the variation of centrifugal force caused by the changes in speed of the shaft rotation, and, therefore, when the shaft rotates at a high speed more lubricant will be automatically supplied to the bearing than when the shaft turns at a slower rate.

It will, of course, be evident that various degrees and extents of slope may be provided for the wall portion 40 and various sizes and arrangements of the oil grooves 44 and 144 may be provided to control the volume and the rate of lubricant feed delivered to the bearing 16 for meeting different bearing requirements. The shafts 14 and 114 need not be disposed in a substantially vertical position as shown, but may lie in any non-horizontal position. It will also be appreciated that the slinger 18 may be fastened to the shaft in other well known ways without deviating from my invention.

The shaft 14 or 114 may support any suitable member, that here shown being an idler pulley 46 rigidly fastened thereon and having a flange 48 surrounding and spaced from the head 20 and adapted to be engaged by the tension tape of a textile machine. And the housing 10 may be rigidly mounted in position in any desired manner. In the present showing, a downwardly extending arm 50 of the housing has a pair of spaced recesses 52 receiving the support rods 54, and a clamping bolt 56 passes through the arm 50 between the support rods and threadably engages a clamping plate 58 which also has rod receiving recesses.

I claim:

1. In a device of the character indicated, a tapering open ended sleeve having an upper end portion adapted to be tightly fitted over the lower end of a supporting shaft, and the upper end portion of said sleeve having a struck-up portion disposed longitudindally of the sleeve and forming a passage for lubricant between said sleeve and said shaft; substantially as described.

2. A device of the character indicated comprising a sheet metal lubricating sleeve having a portion of its length adapted to fit over a rotatable member, and said sleeve having a plurality of spaced struck-up portions respectively extending beyond the length of said member engaging portion and providing open ended lubricant passages respectively extending between and beyond the interengaging portions of the sleeve and the rotatable member; substantially as described.

3. In a device of the character indicated, a housing, a rotatable member supported by a bearing in the housing for rotation about a non-horizontal axis, said housing having a lubricant reservoir, a tapering sleeve member secured at its enlarged upper end to said rotatable member and having its reduced lower end in the reservoir, and one of said members having a grooved portion providing an open-ended lubricant passage extending between and beyond the engaged portions of the sleeve and said rotatable member; substantially as described.

4. In a device of the character indicated, a housing, a rotatable member supported by a bearing in the housing for rotation about a non-horizontal axis, said housing having a lubricant reservoir, a tapering sleeve secured at its upper end to said rotatable member and having an open lower end of reduced diameter extending beyond the rotatable member and received in said reservoir, and the upper sleeve end having a longitudinally grooved portion opening onto said rotatable member and which provides a lubricant passage between the rotatable member and said sleeve; substantially as described.

5. In a device of the character indicated, the combination with a rotatable shaft, of a sleeve secured thereto in overlying relation and extending beyond the end of the same, and one of said elements having a groove which opens onto the other element and which provides an open ended passage that extends between the interengaged portions of said elements; substantially as described.

6. In a device of the character indicated, a shaft, a sleeve fastened on the shaft and projecting beyond the end thereof, and one of said members having an open ended conduit groove which extends between and beyond the engaged portions of the sleeve and the shaft, said other member lying across the groove and providing a closed passage for a portion of the length of said groove; substantially as described.

7. In a device of the character indicated, a housing having a lubricant reservoir, annularly spaced relatively rotatable inner and outer bearing elements supported in the housing above said reservoir, a tapering sleeve member mounted on the end of said inner member and having a reduced lower end extending into said reservoir, and the upper sleeve end having a struck-up portion longitudinally of the sleeve and extending between the bearing members and providing an open ended lubricant passage between the inner member and said sleeve; substantially as described.

THOMAS C. DELAVAL-CROW.